(12) United States Patent
Draper et al.

(10) Patent No.: US 10,272,876 B2
(45) Date of Patent: Apr. 30, 2019

(54) METHOD OF OPERATING AN AD HOC NETWORK TO PROTECT A PASSENGER-AS-A-PEDESTRIAN AND SYSTEM TO PROTECT A PASSENGER-AS-A-PEDESTRIAN

(71) Applicant: Peiker Acustic GmbH & Co. KG, Valeo Peiker Telematics Product Line, Friedrichsdorf (DE)

(72) Inventors: Andrew Draper, Gross Pointe, MI (US); Amine Taleb-Bendiab, Ann, MI (US)

(73) Assignee: Peiker Acustic GmbH & Co. KG, Valeo Peiker Telematics Product Line, Friedrichsdorf (DE)

( * ) Notice: Subject to any disclaimer, the term of this patent is extended or adjusted under 35 U.S.C. 154(b) by 0 days.

(21) Appl. No.: 15/382,873

(22) Filed: Dec. 19, 2016

(65) Prior Publication Data
US 2018/0174452 A1 Jun. 21, 2018

(51) Int. Cl.
*G07C 9/00* (2006.01)
*G08G 1/16* (2006.01)
*B60R 25/24* (2013.01)
*H04W 4/46* (2018.01)
*B60R 21/0134* (2006.01)
*H04L 29/08* (2006.01)
*H04L 29/06* (2006.01)

(52) U.S. Cl.
CPC .......... *B60R 25/24* (2013.01); *B60R 21/0134* (2013.01); *G08G 1/162* (2013.01); *H04W 4/46* (2018.02); *G07C 9/00174* (2013.01); *H04L 67/12* (2013.01); *H04L 69/08* (2013.01)

(58) Field of Classification Search
CPC ........ B60Q 1/525; B60Q 5/006; B60R 25/24; B60R 25/33; G08G 1/096791; G08G 1/0112; G08G 1/161; G08G 1/205; H04L 67/12
See application file for complete search history.

(56) References Cited

U.S. PATENT DOCUMENTS

2007/0106431 A1* 5/2007 Tsuzuki ................ G08G 1/161
701/1
2012/0025964 A1* 2/2012 Beggs .................. B60Q 1/2673
340/435

(Continued)

*Primary Examiner* — Mirza F Alam
(74) *Attorney, Agent, or Firm* — Burr & Brown, PLLC

(57) ABSTRACT

A method of operating an ad hoc network to protect a passenger-as-a-pedestrian of a stationary vehicle from a vehicle in motion. The network comprises an electronic key for the stationary vehicle carried by the passenger-as-a-pedestrian, an electronic-control-unit with a car-access-system and an on-board-unit with a vehicle-to-vehicle-system as components of a vehicle-network of the stationary vehicle. The car-access-system interfaces the vehicle-to-vehicle-system through the vehicle-network, the one vehicle in motion comprises a vehicle-to-vehicle-system, the on-board-unit of the stationary vehicle receives information from the car-access-system of the electronic-control-unit of the stationary vehicle, and the on-board-unit communicates based on the received information as vehicle-to-driver communication via the vehicle-to-vehicle system of the stationary vehicle with any vehicle in motion.

14 Claims, 1 Drawing Sheet

(56) References Cited

U.S. PATENT DOCUMENTS

| | | | |
|---|---|---|---|
| 2014/0112538 A1* | 4/2014 | Ogawa | G08G 1/166 382/103 |
| 2015/0035685 A1* | 2/2015 | Strickland | B60Q 9/008 340/901 |
| 2015/0237141 A1* | 8/2015 | Stahlin | G08G 1/0112 370/338 |
| 2016/0225260 A1* | 8/2016 | Lin | B60R 25/24 |

* cited by examiner

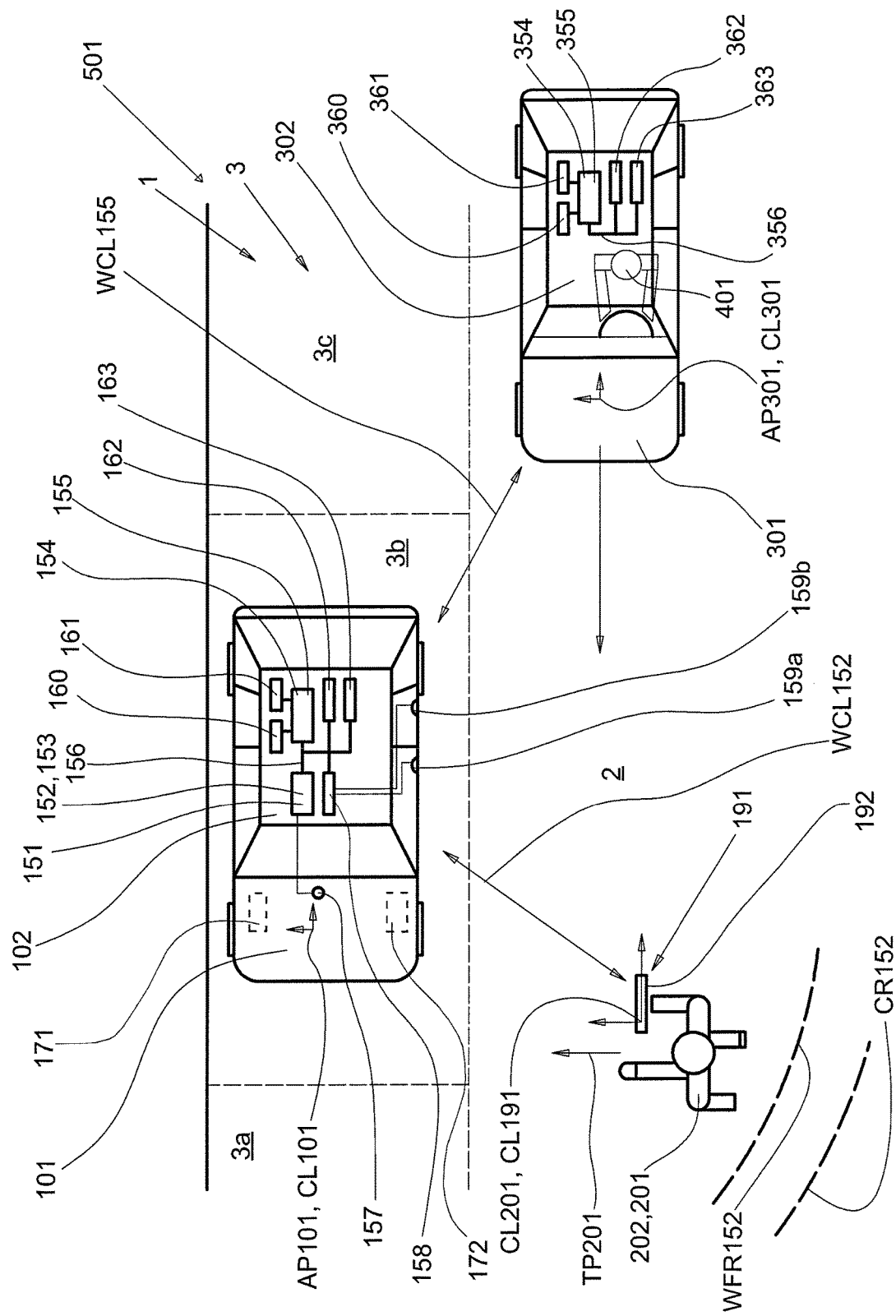

METHOD OF OPERATING AN AD HOC NETWORK TO PROTECT A PASSENGER-AS-A-PEDESTRIAN AND SYSTEM TO PROTECT A PASSENGER-AS-A-PEDESTRIAN

FIELD OF THE INVENTION

The present invention relates to methods of operating an ad hoc network to protect a passenger-as-a-pedestrian of a stationary vehicle from a vehicle in motion and relates to a system to protect a passenger-as-a-pedestrian of a stationary vehicle from a vehicle in motion.

BACKGROUND OF THE INVENTION

Car-access-systems as, for example, personal entry and passive-entry-passive-start systems and vehicle-to-vehicle respectively vehicle-to-vehicle systems are widely used in modern vehicles.

Vehicle-to-vehicle (V2V) applications are gaining more and more traction around the world due to the potential safety benefits that they offer in the avoidance of vehicle collisions. In some regions such V2V-applications may be mandated in the not so distant future e.g. USA FMVSS150.

At the same time, car-access-systems (CAS) are moving towards smarter key systems, such as passive-entry-passive-start systems (PEPS). These PEPS-systems typically use a keyfob and even a SmartPhone as a Virtual Key (SP-VK). The PEPS-system is seeing rapid growth worldwide, up to 50% take rate by 2025. That is twice as much as today's take rate. In addition, the progress in PEPS-technology is enabling a precise determination of the approach location and relative distance of the driver-as-a-pedestrian to the vehicle, when carrying the keyfob or SP-VK. In PEPS-systems, the approach location of the driver-as-a-pedestrian relative to their vehicle is based on either received-signal-strength-indicator (RSSI) and/or RF Ranging (Time-of-Flight) techniques. And, in combination with signal time polling, the approach of the driver-as-a-pedestrian approach location can be determined with a certain level of accuracy. It can be as low as several centimeters to a few meters. Even though the detection range can be as high as a few hundred meters, this invention would be more valuable from a safety standpoint when the driver is within the vicinity of the car, in the range of around 15 m or less. This range is typically where the welcome function (WF) of the PEPS-system is triggered and some in-car components wake up.

U.S. Patent Application Publication No. 2016/0225260 A1 relates to a vehicle safety system with vehicle-to-vehicle communication system, wherein a remote-keyless-entry fob is equipped with a vehicle-to-vehicle remote frequency receiver to receive messages of the vehicle-to-vehicle communication system of the vehicle.

SUMMARY OF THE INVENTION

In accordance with the present invention, there is an interaction between the car-access-system which is part of the electronic control unit and the vehicle-to-vehicle system which is part of the on-board-unit via the vehicle network. The connection of these systems within the vehicle enables the on-board-unit to receive at least temporarily information from the electronic control unit and at least temporarily communicate based on the information received from the car-access-system via the vehicle-to-vehicle system with any vehicle or with selected vehicles in motion. Since the information is generated by the proprietary car-access-system in communication with an electronic key of the car-access-system which is carried by a passenger-as-a-pedestrian of the stationary vehicle there is no need to establish an additional short range communication for any communication of the electronic key or any comparable device with the vehicle and especially the vehicle-to-vehicle system. A communication path between the electronic key, the car-access-system of the electronic control unit and the vehicle-to-vehicle system of the on-board-unit is a sure way to provide the vehicle-to-vehicle system as well as the electronic key with all necessary data to increase safety without the necessity to provide the electronic key with an additional energy consuming wireless system. The electronic key is not equipped with a vehicle-to-vehicle-transceiver. The electronic key does not comprise a vehicle-to-vehicle-transceiver in order to guarantee a simple and distinct communication, reduce energy consumption and to keep an installation space for electronics small.

By the inventive method respectively by the inventive system vehicle-to-driver safety functions for the passenger-as-a-pedestrian of a parked/stationary vehicle are achieved offering additional protection particularly when the passenger-as-a-pedestrian exits/enters the vehicle from the side facing the road or when the passenger-as-a-pedestrian heads towards the parked/stationary vehicle. By a vehicle-to-driver message the passenger-as-a-pedestrian carrying an electronic key is protected against other vehicles passing by. A vehicle-to-driver message is a message sent by the vehicle-to-vehicle system from a parked/stationary vehicle to a vehicle in motion with the aim to protect a passenger-as-a-pedestrian inside or outside of a stationary vehicle from a vehicle in motion.

This protection is achieved by defining specific interactions between the car-access-system which is, for example, a passive-entry-passive-start system and the on-board-unit. Whereby the parked/stationary vehicle acts as a surrogate vehicle-to-vehicle and especially vehicle-to-driver transmitter for the passenger-as-a-pedestrian. Specifically, when car-access-system of the stationary vehicle detects the presence and location of an electronic key approaching or departing the stationary vehicle, the on-board-unit of the stationary vehicle will begin to transmit messages via the vehicle-to-vehicle system on behalf of the passenger-as-a-pedestrian.

The advantages of such a concept which relies on technologies that might become standard in not so distant future would bring new added safety for pedestrian activity around a stationary vehicle. This method has the advantage of requiring no new or additional state-of-the art technology to be added to the electronic key and no added power load on this device. It also benefits from the fact that the vehicle-to-vehicle transmitter which broadcast the vehicle-to-driver messages is remote from the passenger-as-a-pedestrian and RF transmission is less likely to be blocked by the human body as it would if the transmitter was in the electronic key.

According to the present invention, a passenger-as-a-pedestrian is any person carrying an electronic key that belongs to the car-access-system of the stationary vehicle or any stationary vehicle. According to the present invention, a passenger-as-a-pedestrian is a driver-as-a-pedestrian of a stationary vehicle carrying an electronic key of this stationary vehicle and/or any co-driver carrying an electronic key of this stationary vehicle.

According to the present invention, the terms "car" and "vehicle" are used as synonyms.

According to the present invention, the term electronic key comprises any identification device especially key or smartphone regardless of its capability to start the engine of a vehicle.

BRIEF DESCRIPTION OF THE DRAWINGS

The foregoing and other features and advantages of the present invention will become apparent to those skilled in the art to which the present invention relates upon reading the following description with reference to the accompanying drawing, in which:

FIG. 1 is a simplified and schematic top view of a stationary vehicle, a vehicle in motion and a driver-as-a-pedestrian of one example embodiment of the present invention.

DETAILED DESCRIPTION

In one example embodiment of the present invention a detail of a road 1 is shown in a top view. The detail shows a traffic lane 2, a parking lane 3 with three parking areas 3a, 3b and 3c. Additionally a stationary respectively parking vehicle 101, a passenger-as-a-pedestrian 201 who is a driver-as-a-pedestrian 202 of the stationary vehicle 101 and a vehicle in motion 301 are shown in schematic top view.

The stationary vehicle 101 is parking in the parking area 3b.

The driver-as-a-pedestrian 202 is crossing the traffic lane 2 and heading for the stationary vehicle 101.

The vehicle in motion 301 is driving on the traffic lane 2 in a parallel direction to the stationary vehicle 101 and heading for the driver-as-a-pedestrian 202.

Only for illustrative purposes on a roof 102 of the stationary vehicle 101 a lot of electronic components of the stationary vehicle 101 are shown in a schematic way. In practice these components are placed inside and/or on the surface of the vehicle in known positions. In detail an electronic control unit 151 which comprises a car-access-system 152 which is constituted by a passive-entry-passive-start system 153 and an on-board-unit 154 which comprises a vehicle-to-vehicle system 155 are shown. The electronic control unit 151 and the on-board-unit 154 are connected by a vehicle network 156 which is designed as a bus system and especially as a CAN-Bus system. The car-access-system 152 comprises an antenna 157, wherein in other inventive arrangements the car-access-system comprises at least four and especially six antennas. Via the vehicle network 156 the electronic control unit 151 respectively the car-access-system 152 is connected to a vehicle body controller 158 which detects and controls a status of door latches which are exemplarily shown as front door latch 159a and rear door latch 159b of right doors the stationary vehicle 101 and a start/stop functionality of the vehicle 101.

The on-board-unit 154 respectively the vehicle-to-vehicle system 155 comprises at least one vehicle-to-vehicle antenna 160 to communicate with other vehicles and a navigation system 161—especially a GPS-system or any comparable system—to determine the current location CL101 of the stationary vehicle 101 wherein the current location CL101 is an absolute position AP101 of the stationary vehicle 101.

The stationary vehicle 101 comprises a vehicle braking and steering system 162 which is connected to the vehicle network 156 and a driver alert center 163 which is connected to the vehicle network 156.

The driver-as-a-pedestrian 202 who is the driver of the stationary vehicle 101 who has left his vehicle 101 and is now returning to his vehicle 101 carries an electronic key 190 of the stationary vehicle 101. The electronic key 191 comprises a keyfob 192. The electronic key 191 is detected by the car-access-system 152 within a detection range respectively welcome function range WFR152 of the car-access-system 152 which is about 15 meters. The car-access-system 152 comprises a wireless communication link WCL152 which is established between the vehicle 101 and the electronic key 191. The wireless communication link WCL152 is established on the basis of any short range communication standard which is appropriate for a communication between the electronic key 191 and the vehicle 101 within a car-access-system 152. Especially Bluetooth is used as communication standard.

The vehicle in motion 301 is similarly equipped as the stationary vehicle. Only for illustrative purposes on a roof 302 of the vehicle in motion 301 a lot of electronic components of the vehicle in motion 301 are shown in a schematic way. In practice these components are placed inside and/or on the surface of the vehicle in known positions. In detail an on-board-unit 354 which comprises a vehicle-to-vehicle system 355 is shown. The on-board-unit 354 is connected by a vehicle network 356 which is designed as a bus system and especially as a CAN-Bus system.

The on-board-unit 354 respectively the vehicle-to-vehicle system 355 comprises at least one vehicle-to-vehicle antenna 360 to communicate with other vehicles and a navigation system 361 to determine the current location CL301 of the vehicle in motion 301 wherein the current location CL301 is an absolute position AP301. The vehicle-to-vehicle system 155 of the stationary vehicle 101 and the vehicle-to-vehicle system 355, the vehicle in motion 301 communicate via a wireless communication link WCL155.

The vehicle in motion 301 comprises a vehicle braking and steering system 362 which is connected to the vehicle network 356 and a driver alert center 363 which is connected to the vehicle network 356. In an interior of the vehicle in motion 301 a driver 401 is shown.

Altogether FIG. 1 illustrates a method of operating an ad hoc network 501 to protect the driver-as-a-pedestrian 202 of the stationary vehicle 101 from a vehicle in motion 301.

Between the vehicle-to-vehicle system 155 of the on-board-unit 154 and the car-access-system 152 which comprises especially a passive-entry-passive-start system 153 direct interface via the vehicle network 156 is enabled.

The car-access-system 152 which comprises especially a passive-entry-passive-start system 153 interfaces to the vehicle-to-vehicle system 155 of the on-board-unit through the vehicle network 156, CAN for example.

When the driver-as-a-pedestrian 202, carrying the electronic key 191 for the car-access-system 152, is approaching the stationary vehicle 101, within the communication range CR152 of the car-access-system 152, and at a certain desired distance, for example, the welcome function range WFR 152 of car-access-system 152, the passive-entry-passive-start system 152 wakes up the on-board-unit 154 of the stationary vehicle 101 for broadcast of a vehicle-to-driver message via the vehicle-to-vehicle system 155 of the stationary vehicle 101 to alert other surrounding vehicles, that are driving by as in the example the vehicle in motion 301.

The car-access-system 152 knows a current location CL191 of the electronic key 191 respectively a current location CL201 of the driver-as-a-pedestrian 202 relative to an absolute position AP101 the stationary vehicle 101. The current location CL191 of the electronic key 191 is for example detected via the signal strength indication (RSSI) technique and/or via the radio frequency (RF) ranging technique. And as the on-board-unit 154 knows as current location CL101 the absolute position AP 101 of the stationary vehicle 101 from the navigation system 161 therefore the on-board-unit 154 can transmit vehicle-to-driver location and travel path messages accurately representing the relative position and a travel path TP201 of the driver-as-a-pedestrian 202 with respect to the absolute position AP101 of the stationary vehicle 101. It is also possible that the vehicle-to-driver message comprises an absolute position of the driver respectively electronic key which is calculated by the electronic control unit of the stationary vehicle or the on-board-unit of the stationary vehicle.

In a preferred embodiment the car-access-system 152 of the stationary vehicle 101 comprises not only one antenna but several antennas 157, 171 and 172—additional antennas are shown by dotted lines—since the antenna(s) count and mounting around the stationary vehicle 101, are critical in defining the approach direction respectively the travel path of the driver-as-a-pedestrian. This means that the car-access-system 152 is, in the case of using several antennas, able to detect more precisely that the driver-as-a-pedestrian 202 is heading for example towards the passenger side door or to the driver side door or to the rear or to the front of the stationary vehicle 101.

When the car-access-system 152 detects that the driver-as-a-pedestrian 202 is safely within the stationary vehicle 101 the vehicle-to-driver messages broadcasted by the vehicle-to-vehicle system 155 of the on-board-unit 154 via vehicle-to-vehicle antenna 160 and received by an on-board-unit 354 of the vehicle in motion 301 via the vehicle-to-vehicle antenna 360 of the vehicle-to-vehicle system 355 would transition to vehicle-to-vehicle messages.

Similarly, a reverse action will occur as the driver-as-a-pedestrian 202 of the stationary vehicle 101 leaves his vehicle. Starting from the detection of the intent of the driver-as-a-pedestrian 202 of the stationary vehicle 101 to leave his vehicle until the driver-as-a-pedestrian 202 is out of the range of the car-access-system 152 of the stationary vehicle 101 the on-board-unit 154 will broadcast via vehicle-to-vehicle antenna 160 vehicle-to-driver messages that will alert the driver 401 of the vehicle in motion 301 about the driver-as-a-pedestrian 202 leaving the stationary vehicle 101 or staying or moving in an relative position to the stationary vehicle 101.

According to an embodiment of the present invention, the electronic key 191 is equipped with an own device to determine its position and sends its own known position to his stationary vehicle 101 via the wireless communication link WCL152 to the stationary vehicle 101 and the stationary vehicle 101 will start transmitting vehicle-to-driver messages to alert the drivers 401 of vehicles in motion 301 via the wireless communication link WCL155. The vehicle-to-driver messages stay based on the position determined of the device of the electronic key 191 until the car-access-system 152 has determined precisely the current location CL191 of the electronic key 191. This method is applied on approach and exit of the driver-as-a-pedestrian 202. On approach of the driver-as-a-pedestrian 202 there is the advantage that the distance between the driver-as-a-pedestrian 202 and the stationary vehicle 101 may be larger than the welcome function range WFR152 of the car-access-system 152 since the welcome function range WFR152 is shorter than the communication range CR152 of the car-access-system 152, wherein the wireless communication link of the car-access-system 152 is used as communication standard.

According to a further embodiment of the present invention, it is intended that the driver-as-a-pedestrian 202 receives vehicle-to-driver messages as safety alerts through the car-access-system 152 especially as a visual alert and/or an auditory alert and/or an haptic alert, wherein the electronic key 191 is in such a case equipped with a light emitting device especially a display and/or a sound emitting device and/or a vibration generator. These alerts would be determined by the on-board-unit 154 from vehicle-to-vehicle messages broadcasted by vehicles in motion 301 and sent via the car-access-system 152 and especially via the passive-entry-passive-start system 153 which is part of the car-access-system 152.

In addition, other non-safety messages can be communicated to the driver-as-a-pedestrian 202, in particular if a smartphone is used as the electronic key 191. For example non-safety messages like a traffic jam in the vicinity could be communicated that the driver-as-a-pedestrian 202 might decide alternate action or delay in using the stationary vehicle 101, or might plan driving the route in advance.

LIST OF REFERENCES 1 road
2 traffic lane
3 parking lane
3a-3c parking area
101 stationary/parking vehicle
102 roof of 101
151 electronic control unit (ECU)
152 car-access-system (CAS)
153 passive-entry-passive-start system (PEPS)
154 on-board-unit (OBU)
155 vehicle-to-vehicle system (V2V)
156 vehicle network (VN)
157 antenna of CAS
158 vehicle body controller
159a front door latch
159b rear door latch
160 vehicle-to-vehicle antenna of 155
161 navigation system of 101
162 vehicle braking and steering system
163 driver alert center
171 antenna of CAS
172 antenna of CAS
191 electronic key (EK) of 101
192 keyfob of 191
AP101 absolute position of 101
CL101 current location of 101
CL191 current location of 191
CR152 communication range of 152
WCL152 wireless communication link between 101 and 191
WCL155 wireless communication link between 155 and 355
WFR152 detection range/welcome function range of 152
201 passenger-as-a-pedestrian
202 driver-as-a-pedestrian
CL201 current location of 201/202
TP201 travel path of 201/202
301 vehicle in motion
302 roof of 301
354 on-board-unit (OBU)
355 vehicle-to-vehicle system (V2V)
356 vehicle network (VN)
360 vehicle-to-vehicle antenna of 355
361 navigation system of 101
362 vehicle braking and steering system
363 driver alert center AP301 absolute Position of 301
CL301 current location of 301
401 driver of 301
501 ad hoc network

The invention claimed is:

1. A method of operating an ad hoc network to protect a passenger-as-a-pedestrian of a stationary vehicle from a vehicle in motion wherein the network comprises
    an electronic key for the stationary vehicle that is carried by the passenger-as-a-pedestrian,
    an electronic-control-unit with a car-access-system and an on-board-unit with a vehicle-to-vehicle system as components of a vehicle-network of the stationary vehicle,
    wherein the car-access-system interfaces to the vehicle-to-vehicle-system through the vehicle-network,
    wherein the at least one vehicle in motion comprises a vehicle-to-vehicle-system,
    wherein the on-board-unit of the stationary vehicle receives at least temporarily information from the car-access-system of the electronic-control-unit of the stationary vehicle,
    wherein the on-board-unit at least temporarily communicates based on the received information from the car-access-system as vehicle-to-driver communication via the vehicle-to-vehicle system of the stationary vehicle with any vehicle or with selected vehicles in motion, and
    wherein in the case that the car-access-system detects that the passenger-as-a-pedestrian with the electronic key is starting to leave the stationary vehicle the car-access-system starts to monitor a movement of the passenger-as-a-pedestrian and if necessary wakes up the on-board-unit for vehicle-to-driver broadcast of the vehicle-to-vehicle-system to alert any surrounding vehicle in motion that is driving by via broadcasting at least a message comprising at least a current location of the passenger-as-a-pedestrian or a travel path of the passenger-as-a-pedestrian.

2. The method of claim 1, wherein in the case that the car-access-system detects that the passenger-as-a-pedestrian with the electronic key is approaching the stationary vehicle by getting into the communication range of the car-access-system the car-access-system starts to monitor a movement of the passenger-as-a-pedestrian and wakes up the on-board-unit for vehicle-to-driver broadcast of the vehicle-to-vehicle-system to alert any surrounding vehicle in motion that is driving by via broadcasting at least a message comprising at least a current location of the passenger-as-a-pedestrian or a travel path of the passenger-as-a-pedestrian.

3. The method of claim 2, wherein the transmission of updated messages and especially updated location messages continues until the car-access-system detects that the passenger-as-a-pedestrian with the electronic key is safely within the stationary vehicle or has left the communication range of the car-access-system of the stationary vehicle.

4. The method of claim 1, wherein the transmission of updated messages and especially updated location messages continues until the car-access-system detects that the passenger-as-a-pedestrian with the electronic key has left the communication range of the car-access-system of the stationary vehicle or is again safely within the stationary vehicle.

5. The method of claim 1, wherein the on-board-unit generates additional information on the basis of the car-access-system of the electronic-control-unit wherein the information comprises at least one status information of the car-access-system in the case the status information is critical the on-board-unit alerts any surrounding vehicle in motion that is driving by via broadcasting at least a message comprising at least a description and location of the occurrence.

6. The method of claim 1, wherein the on-board-unit of the vehicle in motion will derive a current location and/or a travel path of the passenger-as-a-pedestrian in a coordinate system of the vehicle in motion on the basis of the received message.

7. The method of claim 1, wherein the relative position of the passenger-as-a-pedestrian with the electronic key to the stationary vehicle and the travel path of the passenger-as-a-pedestrian with the electronic key is detected by the car-access-system.

8. The method of claim 1,
    wherein the car-access-system comprises only one antenna for detection of the relative position of the passenger-as-a-pedestrian to the stationary vehicle or
    wherein the car-access-system comprises at least two antennas and especially at least six antennas for detection of the relative position of the passenger-as-a-pedestrian to the stationary vehicle.

9. The method of claim 1, wherein the car-access-system is additionally to at signal strength detection and/or RF Ranging and/or any other wireless detection of at least a position or a distance detecting leaving or entering of the passenger-as-a-pedestrian with the electronic key the stationary vehicle by monitoring all door latches of the stationary vehicle and providing the on-board-unit with these data.

10. The method of claim 1, wherein the car-access-system is a passive-entry-passive-start System.

11. The method of claim 1, wherein the electronic key is designed as a keyfob or as a smart keyfob having a display or as a SmartPhone or as a SmartWatch or as any wearable, wherein the electronic key especially comprises alert means e.g. light emitting means and/or sound emitting means and/or vibrating means.

12. The method of claim 1, further comprising:
    in the case that the car-access-system of the stationary vehicle detects that the passenger-as-a-pedestrian is outside the stationary vehicle or entering the stationary vehicle or getting out of the stationary vehicle transmitting a warning-message to the electronic-Key of the passenger-as-a-pedestrian via the car-access-system of the stationary vehicle in the case that the vehicle-to-vehicle-system of the stationary vehicle is informed by vehicle-to-vehicle broadcast of any surrounding vehicle in motion that is driving by and especially might collide with the passenger-as-a-pedestrian.

13. The method of claim 1, wherein communication of the on-board-unit is done by broadcasting messages as vehicle-to-driver broadcast via the vehicle-to-vehicle system of the stationary vehicle.

14. A system for transmission of information concerning a passenger-as-a-pedestrian of a stationary vehicle to a vehicle in motion comprising:
    an electronic key for the stationary vehicle that is carried by the passenger-as-a-pedestrian,
    an electronic-control-unit with a car-access-system and an on-board-unit with a vehicle-to-vehicle-system as components of a vehicle-network of the stationary vehicle,
    wherein the car-access-system interfaces to the a vehicle-to-vehicle-system through the vehicle-network,
    wherein the at least one vehicle in motion comprises a vehicle-to-vehicle-system, wherein the on-board-unit of the stationary vehicle receives at least temporarily information from the car-access-system of the electronic-control-unit of the stationary vehicle via the vehicle network wherein these information comprise at least a current location of the passenger-as-a-pedestrian or a travel path of the passenger-as-a-pedestrian, wherein the on-board-unit at least temporarily broadcasts messages based on the received information as vehicle-to-driver broadcast via the vehicle-to-vehicle-system of the stationary vehicle to any the vehicle in motion, and wherein in the case that the car-access-system detects that the passenger-as-a-pedestrian with the electronic key is starting to leave the stationary vehicle the car-access-system starts to monitor a movement of the passenger-as-a-pedestrian and if necessary wakes up the on-board-unit for vehicle-to-driver broadcast of the vehicle-to-vehicle-system to alert any surrounding vehicle in motion that is driving by via broadcasting at least a message comprising at least a current location of the passenger-as-a-pedestrian or a travel path of the passenger-as-a-pedestrian.

\* \* \* \* \*